(12) United States Patent
Carroll

(10) Patent No.: US 11,392,402 B1
(45) Date of Patent: Jul. 19, 2022

(54) COORDINATED MIGRATION OF NETWORK-ACCESSIBLE SERVICES WHILE MAINTAINING SERVICE AVAILABILITY IN PRIOR ENVIRONMENT

(71) Applicant: Amazon Technologies, Inc., Seattle, WA (US)

(72) Inventor: Theodore Allen Carroll, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 289 days.

(21) Appl. No.: 16/586,419

(22) Filed: Sep. 27, 2019

(51) Int. Cl.
*G06F 9/455* (2018.01)
*G06F 9/50* (2006.01)
*H04L 29/12* (2006.01)
*H04L 101/622* (2022.01)
*H04L 61/5014* (2022.01)

(52) U.S. Cl.
CPC ........ *G06F 9/45558* (2013.01); *G06F 9/5077* (2013.01); *G06F 9/5083* (2013.01); *G06F 9/5088* (2013.01); *H04L 61/2015* (2013.01); *H04L 61/6022* (2013.01); *G06F 2009/4557* (2013.01); *G06F 2009/45595* (2013.01)

(58) Field of Classification Search
None
See application file for complete search history.

(56) References Cited

PUBLICATIONS

Fischer et al., "Wide-Area Virtual Machine Migration as Resilience Mechanism", 2011, IEEE, pp. 72-77. (Year: 2011).*
Medina et al., "A Survey of Migration Mechanisms of Virtual Machines", Jan. 2014, ACM Computing Surveys, vol. 46, No. 3, Article 30, pp. 1-33. (Year: 2014).*
Mann et al., "CrossRoads: Seamless VM Mobility Across Data Centers through Software Defined Networking", 2012, IEEE, pp. 88-96. (Year: 2012).*
Chen et al., "A Scalable Multi-Datacenter Layer-2 Network Architecture", Jun. 2015, ACM. (Year: 2015).*
Migrating VMs with Aviatrix IPMotion and AWS Migration Hub Service, retrieved on Sep. 20, 2019 from https://docs.aviatrix.com/index.html.
IPmotion Setup Instructions, retrieved on Sep. 20, 2019 from https://docs.aviatrix.com/index.html.

* cited by examiner

*Primary Examiner* — Qing Yuan Wu
(74) *Attorney, Agent, or Firm* — Knobbe, Martens, Olson & Bear, LLP

(57) ABSTRACT

The present disclosure generally relates to enabling migration of services between a first and second environment, while maintaining a local availability of those servers within the first environment. Specifically, embodiments enable the services to remain locally available with the first environment without modification of operation of clients within the first environment. A migration gateway is provided in the first environment that, on migration of a service from the first to the second environment, can announce availability of the service at the gateway. The gateway can then act as a proxy for the service in the second environment. In one configuration, the gateway adopts an Internet Protocol (IP) address of a server that has been migrated, such that clients may be unaware that migration has occurred.

20 Claims, 5 Drawing Sheets

COORDINATED MIGRATION OF NETWORK-ACCESSIBLE SERVICES WHILE MAINTAINING SERVICE AVAILABILITY IN PRIOR ENVIRONMENT

BACKGROUND

Computing devices can utilize communication networks to exchange data. Companies and organizations operate computer networks that interconnect a number of computing devices to support operations or to provide services to third parties. The computing systems can be located in a single geographic location or located in multiple, distinct geographic locations (e.g., interconnected via private or public communication networks). Specifically, data centers or data processing centers, herein generally referred to as a "data center," may include a number of interconnected computing systems to provide computing resources to users of the data center. The data centers may be private data centers operated on behalf of an organization or public data centers operated on behalf, or for the benefit of, the general public.

Private computing networks operating on behalf of a single entity are sometimes referred to as "on-premises" environments, as computing devices are implemented on the entity's premises. On-premises environments generally require the entity to deploy, configure, and maintain the physical devices provided network-accessible services.

In contrast to on-premises environments, hosted computing environments generally include a network of computing devices operated by a hosting entity on behalf of client entities, which may contract with the hosting entity for use of resources of the computing devices. One type of hosted computing environment is a cloud computing environment.

Cloud computing, in general, is an approach to providing access to information technology resources through services, such as Web services, where the hardware and/or software used to support those services is dynamically scalable to meet the needs of the services at any given time. In cloud computing, elasticity refers to network-delivered computing resources that can be scaled up and down by the cloud service provider to adapt to changing requirements of users. The elasticity of these resources can be in terms of processing power, storage, bandwidth, etc. Elastic computing resources may be delivered automatically and on-demand, dynamically adapting to the changes in resource requirement on or within a given user's system. For example, an entity might use a cloud service to host a large online streaming service, set up with elastic resources so that the number of webservers streaming content to users scale up to meet bandwidth requirements during peak viewing hours, and then scale back down when system usage is lighter.

A user typically will rent, lease, or otherwise pay for access to resources in a hosted computing environment, and thus does not have to purchase and maintain the hardware and/or software to provide access to these resources. This provides a number of benefits, including allowing users to quickly reconfigure their available computing resources in response to the changing demands of their enterprise, and enabling the hosting entity to automatically scale provided computing service resources based on usage, traffic, or other operational needs. This dynamic nature of network-based computing services, in contrast to a relatively static infrastructure of on-premises computing environments, provides many advantages preferred by clients.

DETAILED DESCRIPTION

Figure 1:
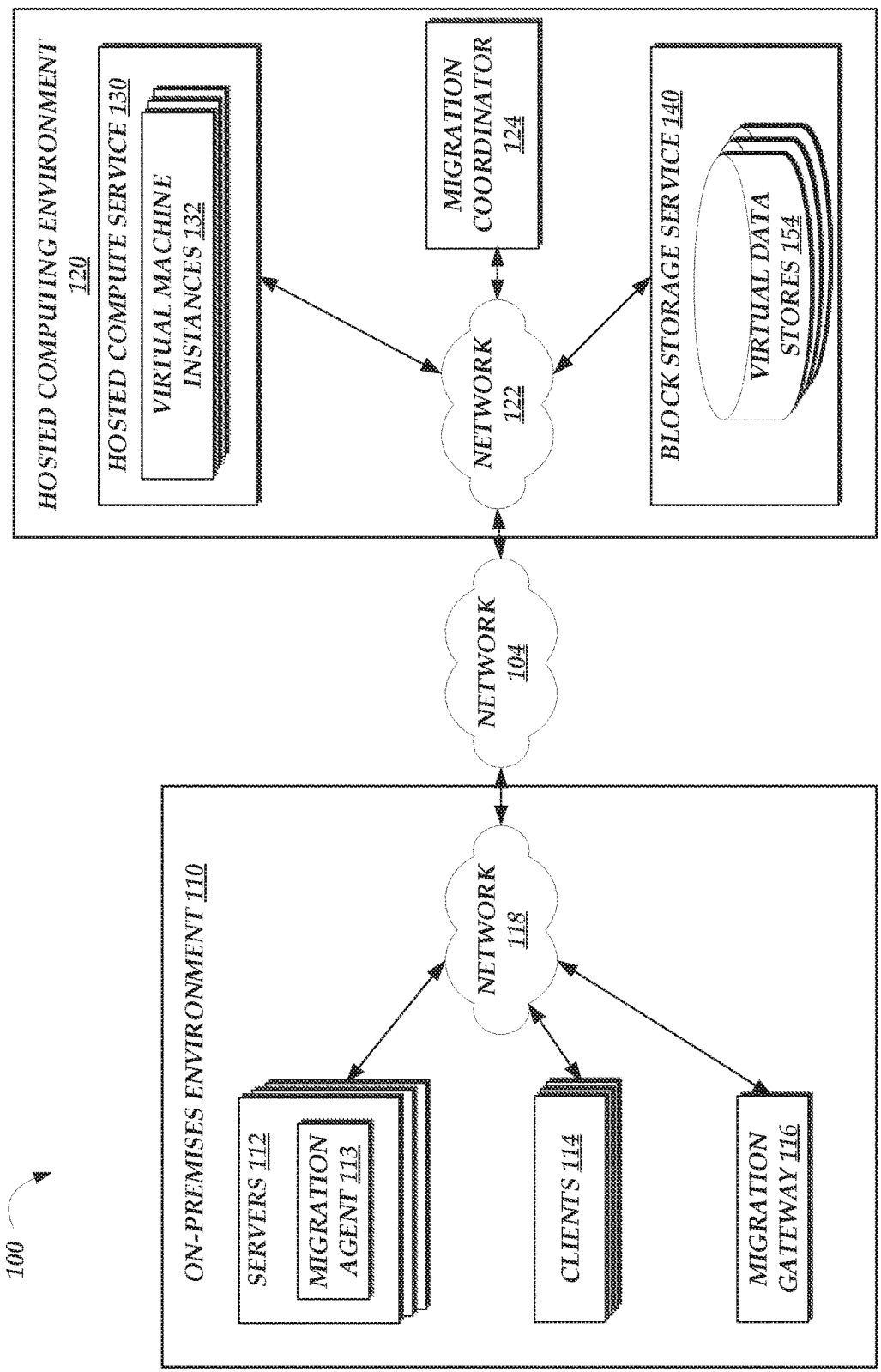
FIG. 1 depicts a schematic diagram of an operating environment according to aspects of the present disclosure, including an on-premises environment including servers providing a set of network-accessible services, and a hosted computing environment providing virtual machine instances to which the network-accessible services can be migrated while maintaining availability of the service within the on-premises environment.

Generally described, aspects of the present disclosure relate to migration of network-accessible services between a first environment and a second environment, in a manner that maintains availability of the network-accessible service within the first environment. In one embodiment, migration may occur between an on-premises environment and a cloud environment. More specifically, embodiments of the present disclosure enable such migration to occur in a manner that results in little or no apparent interruption to the service from the point of view of client devices within the environment.

Traditional migration of services to cloud environments generally involves migration of an entire service "stack," which refers to a number of different interrelated services that collectively implement a desired functionality. For example, a database service, web service, object storage service, and authentication service may operate to collectively provide a web site to clients within an on-premises environment. Due to the interconnections between such services, typical migration of the web site to a cloud environment might involve migration of all services to that environment. This migration of entire stacks can be complicated and costly, requiring significant human involvement. In addition to requiring coordinated migration of all services at once, in many instances software stacks are so complex and intertangled that it is unclear precisely what services interconnect within an environment. Thus, before migration can occur, data analysis tools must often be deployed within an environment to determine interconnections between such services. Migration thus becomes a significant and costly endeavor that in some cases is avoided entirely, despite the advantages of use of a hosted computing environment.

Embodiments of the present disclosure address these problems by enabling migration of a single service to a remote environment, such as a hosted computing environment, while maintaining availability of the service to its initial environment. Because the service is maintained within the initial environment, migration of an entire stack is not required. Rather, individual services can be migrated while maintaining operation of the stack within the initial environment. As more individual services are migrated, more and more of the software stack can function from within the remote environment, eventually enabling migration of a final service from the first environment and completing migration of the stack. This gradual migration significantly reduces the complexity and coordination of software stacks.

In accordance with embodiments of the present disclosure, availability of a migrated service within a first environment can be maintained by operation of a migration gateway within the first environment. As will be described below, a migration gateway can be configured to detect migration of a service from the first environment to a second environment, and on detecting such migration, to advertise an availability of the service from the gateway. In one embodiment, such advertisement is accomplished by adopting, at the gateway, a network address previously associated with a server computing device providing the service. For example, where the service is available at a given internet protocol (IP) address, the gateway may utilize the Address Resolution Protocol (ARP) to advertise itself (e.g., it's physical address, such as a Media Access Control (MAC) address) as having the given IP address. In this manner, the gateway can redirect traffic to the service away from the server previously providing the service, and to the gateway. The gateway can obtain a network address of a device providing the service after migration (e.g., an address of a server within a second environment, such as a virtual machine instance within a hosted computing environment), and thereafter act as a proxy for that device. Specifically, the gateway may obtain requests to access the service at the network address previously used for the service, and forward such requests to the device providing the service after migration. Similarly, the gateway may obtain responses to such requests from the device providing the service after migration, and return the responses to a requesting device.

Notably, because the gateway maintains availability of the service at the same network address previously used for the service, there may be little or no apparent loss of availability of the service to client devices. In instances where a temporary loss of availability occurs (such as during finalization of migration of the service from the first to the second environment), such loss of availability may appear minimal to client devices, similarly to the loss of availability caused by rebooting a server.

As will be appreciated by one of skill in the art in light of the present disclosure, the embodiments disclosed herein improves the ability of computing systems to migrate network-accessible services between environments, enabling migration of individual services while maintaining operation of other services or devices dependent on or interdependent with such service. The presently disclosed embodiments therefore address technical problems inherent within computing systems, such as the difficulty of coordinating operation of multiple devices within a network and handling intercommunication between such devices. These technical problems are addressed by the various technical solutions described herein, including implementation of a migration gateway within a first environment that coordinates traffic between two environments in a manner that results in little or no apparent loss of availability of a service during migration. Thus, the present disclosure represents an improvement on existing migration techniques and computing systems in general.

Example embodiments of the present disclosure may be described in terms of a "client-server" architecture, in which one computing device acts as a client of a service provided by another device. However, one skilled in the art will appreciate that devices may act as both servers of services and clients. For example, a first server may provide a service used by a second server, which in turn provides a service to end users. As such, the second server may be considered both a client of the first server and a server to end users. In some instances, two services are interdependent, such that two services act as both servers and clients to one another. Thus, terminology such as "client device" and "server" should be understood to be illustrative, and in some instances a device may act both as a client and server.

The foregoing aspects and many of the attendant advantages of this disclosure will become more readily appreciated as the same become better understood by reference to the following description, when taken in conjunction with the accompanying drawings.

FIG. 1 depicts an example computing environment 100 including an on-premises environment 110, in which one or more network-accessible services are implemented by a set of servers 112, and a hosted computing environment including virtual machine instances 132 to which the services may be migrated while maintaining availability of the services within the on-premises environment 110.

As shown in FIG. 1, the on-premises environment 110 includes a set of servers 112 and clients 114 in communication via a network 118. The network illustratively represents a local area network (LAN) of the environment 110, enabling intercommunication between the servers 112 and clients 114. Servers 112 illustratively represent any computing device configured to provide network-accessible services over the network 118. Clients illustratively represent any computing device accessing such services, including for example desktop computers, laptops, smartphones, tablets, e-readers, gaming consoles, and the like. While shown as distinct in FIG. 1, servers 112 may act as clients 114, and vice versa. For example, a service provided by a first server 112 may act as a client of a service provide by a second server 112.

The hosted computing environment 120 includes a hosted compute service 130 that provides a set of virtual machine instances 132, to which services provided by servers 112 may be migrated. Generally described, the hosted compute service 130 enables users to create, configure, and manage operation of virtual machine instances 132, each of which represents a configurable, virtualized computing device hosted on a substrate host computing device. Each virtual machine instance 132 may, for example, represent a virtual computing device provisioned with an operating system and various other software and configured according to specification of a user to provide a network-based service for or on behalf of the user. For example, virtual machine instances 132 may be configured to provide web servers, databases, transcoding services, machine learning services, or any of a variety of computational tasks. The virtual compute service 130 may provide a variety of types of virtual machine instances 132 representing, for example, processors of different central processing unit (CPU) architectures, different additional processors (e.g., graphically processing units, application specific integrated circuits (ASICS), etc.), different speeds or configurations of such processors, and the like. A variety of techniques for implementing a virtual compute service 130 to provide virtual machine instances 132 are known in the art, and thus operation of the virtual compute service 130 is not described in detail herein.

While the virtual compute service 130 is shown in FIG. 1 as including virtual machine instances 132, the virtual compute service 130 may in some instances additionally or alternatively provide "bare metal" servers. Generally described, a "bare metal" server refers to a single-tenant physical host device, as opposed to host devices which may have multiple tenants (e.g., different customers) by virtualizing the server using a hypervisor to host multiple virtual machines for the multiple tenants. Bare metal servers might not run a hypervisor or be virtualized, but can still be delivered via a cloud provider network service model. In some scenarios, customers may use bare metal servers to run their own hypervisor, or may run workloads in a non-virtualized environment for direct access to the processor and memory resources of the underlying server. Accordingly, while embodiments of the present disclosure are described with reference to VM instances 132, a bare metal server may additionally or alternatively be used.

Further, while the hosted compute service 130 is shown in FIG. 1 as including virtual machine instances 132, the hosted compute service 130 may in some instances additionally or alternatively provide customers with container-based compute resources. A container, as referred to herein, packages up code and all its dependencies so an application (also referred to as a task) can run quickly and reliably from one computing environment to another. A container image is a standalone, executable package of software that includes everything needed to run an application process: code, runtime, system tools, system libraries and settings. Container images become containers at runtime. Containers are thus an abstraction of the application layer (meaning that each container simulates a different software application process). Though each container runs isolated processes, multiple containers can share a common operating system, for example by being launched within the same virtual machine. In contrast, virtual machines are an abstraction of the hardware layer (meaning that each virtual machine simulates a physical machine that can run software). Virtual machine technology can use one physical server to run the equivalent of many servers (each of which is called a virtual machine). While multiple virtual machines can run on one physical machine, each virtual machine typically has its own copy of an operating system, as well as the applications and their related files, libraries, and dependencies. Virtual machines are commonly referred to as compute instances or simply "instances." Some containers can be run on instances that are running a container agent, and some containers can be run on bare-metal servers.

Because the virtual compute service 130 can be generally configured to provide computation resources (e.g., as opposed to data storage), the hosted computing environment 120 further includes a block storage service 140. As used herein, "block storage" generally refers to data storage organized as blocks, which are typically fixed-size data sequences of a given number of bytes (e.g., 2" kilobytes for a specified value of n). Block storage can be contrasted, for example, with object storage systems, which enable access and manipulation of data at the level of an individual object (e.g., a file). Block storage is commonly used as principle storage of a computing device, including a virtual computing devices. For example, most hard disk drives represent block storage devices, and most operating systems (OSs) are intended for installation on block storage devices. As such, the block storage service 140 can provide network-based access to a virtualized block data stores 154 (e.g., representing virtual hard disk drives). For example, virtual machine instances 132 may connect via a network to the block storage service 140 in order to "attach" a virtualized hard drive of the service 140 and store an operating system of the instance 132. In this manner, the need of the hosted compute service 130 to provide data storage is reduced or eliminated, and resiliency of virtual machine instances 132 is increased. Both instances and containers as described herein may "attach" to a virtual data store 154 in order to use the virtual data store 154 as if it were a local disk. For example, a software component referred to as a data store "client" may run in an instance or container. That client represents instructions that enable a virtual machine instance 132 or container to connect to, and perform I/O operations at, a virtual data store 154 (e.g., a data volume stored on a physically separate computing device accessed over a network). The data store client may be implemented on an offload card of a server that includes the processing units (e.g., CPUs or GPUs) of the instance 132 or container.

In FIG. 1, the hosted compute service 130 and the block storage service 140 are interconnected by a network 122, which illustratively represents an internal network of the hosted computing environment 120, which internal network may support high speed communication between instances 132 and virtual data stores 154. Thus, clients of the environment 120 may utilize compute resources provided by the hosted compute service 130, in conjunction with data storage resources provided by the block storage service 140, to implement any variety of network-accessible services. In some instances, the network 122 may provide virtual networking services to instances 132. For example, the network 122 may be configured to create virtualized networks that enable multiple instances 132 to operate as if they existed within a local area network. Such virtualized networks are in some cases referred to as "virtual private clouds," or VPCs. By placing multiple instances 132 within a VPC, a user may be enabled to, for example, recreate the on-premises environment 110 within the hosted environment 120.

The on-premises environment 110 and hosted computing environment 120 may communicate via a network 104, which may include any wired network, wireless network, or combination thereof. For example, the network 104 may be wide area network (WAN), including global area networks (GANs) such as the Internet, cable network, satellite network, cellular telephone network, or combination thereof. The network 104 may be a publicly accessible network, or may be a private or semi-private network, such as a corporate or university intranet. The network 104 may include one or more wireless networks, such as a Global System for Mobile Communications (GSM) network, a Code Division Multiple Access (CDMA) network, a Long Term Evolution (LTE) network, or any other type of wireless network. The network 104 (as well as networks 118 and 122) can use protocols and components for communicating via the Internet or any of the other aforementioned types of networks. For example, the protocols used by the network 104 may include Hypertext Transfer Protocol (HTTP), HTTP Secure (HTTPS), Message Queue Telemetry Transport (MQTT), Constrained Application Protocol (CoAP), and the like. Protocols and components for communicating via the Internet or any of the other aforementioned types of communication networks are well known to those skilled in the art and, thus, are not described in more detail herein. In one embodiment, the network 104 represents a logical network implemented by an underlying physical network. For example, the network 104 may represent a virtual private network (VPN) tunnel between networks 118 and 122.

In accordance with aspects of the present disclosure, an operator of the on-premises environment 110, such as an administrator, may desire to migrate a network-accessible service from a server 112 within the on-premises environment 110 to a virtual machine instance 132 of the hosted computing environment 120, to obtain the benefits associated with use of that environment 120 (e.g., high availability and scalability, low cost, etc.). However, operation of servers 112 and clients 114 may include complex and varied network interactions, and each of the servers 112 and clients 114 may be configured to operate within the network 118. Thus, simple migration of a service from a server 112 to a VM instance 132 may interfere with proper operation of that service, servers 112, or clients 114. Moreover, reconfiguration of individual servers 112 and clients to operate over the network 104 (and to the environment 120) may be difficult and time consuming, as it may be unclear what interdependencies exist between a service, other servers 112, and clients 114. While techniques exist that can bridge the networks 118 and 122 for some purposes, these techniques often require at least some reconfiguration of devices to utilize such a bridge. For example, network 118 and a VPC on the environment 120 may be configured to be linked via a virtual private network (VPN) tunnel, according to VPN techniques that are known in the art. However, such a bridge often maintains a logical division between networks 118 and 122 (e.g., as different subnets), and thus generally requires servers 112 and clients 114 to be reconfigured to utilize that bridge, such that they reach a service implemented by a virtual machine instance 132, rather than within the environment 110. While technologies such as the domain name system (DNS) may automate some aspects of that reconfiguration, propagation of changes to DNS systems can lead to significant downtime during such reconfiguration. Moreover, reconfiguration to utilize network bridges again generally requires knowledge of interdependencies between and among servers 112 and clients 114, disincentivizing use of such technologies.

Mass migration of all servers 112 and clients 114, such as by entirely recreating the on-premises environment 110 in the hosted computing environment 120 may address these issue, but is also costly in terms of time and complexity, and may cause significant downtime. Moreover, an administrator may desire that some services or clients 114 remain within the environment 110 (e.g., for security or accessibility purposes).

Embodiments of the present disclosure address these problems by enabling migration of individual services from servers 112 within the on-premises environment 110 to virtual machine instances 132 within the hosted computing environment 120, while maintaining availability of the services within the on-premises environment 110 without reconfiguration of remaining servers 112 or clients 114. Specifically, as shown in FIG. 1, the on-premises environment 110 includes a migration coordinator 124, representing a computing device (e.g., a VM instance 132 or physical computing device) configured to coordinate migration of servers 112 from the on-premises environment 110 to the hosted computing environment 120. As discussed in more detail below, the migration coordinator 124 is illustratively configured to obtain instructions (e.g., from a client 114) to migrate a server 112, and to interact with the hosted compute service 130 and the server 112 to facilitate that migration. Moreover, the migration coordinator 124 can be configured to interact with a migration gateway 116, instructing that gateway 115 to act as a proxy for communications between devices within the on-premises environment 110 and virtual machine instances 132, thus enabling devices within the environment 110 to access services migrated to instances 132 as those services existed in the environment 110 prior to migration. As will be described in more detail below, the migration gateway 116 can be configured to detect migration of a service, such as by obtaining a migration notification from the migration coordinator 124. On detecting migration, the migration gateway 116 may adopt a network address of the server previously providing the service, such as by issuing an ARP response within the network 118 indicating that the gateway 116 is associated with that network address. The migration gateway 116 can therefore attract traffic of the service (e.g., requests from clients 114) to the gateway 116. Moreover, the gateway 116 can obtain a network address of a VM instance 132 (e.g., an address addressable on the network 104), and thereafter act as a proxy for that instance 132, forwarding requests for the service from clients 114 to the instance 132 and passing responses from the instance 132 to the clients 114. The gateway 116 can illustratively obtain the network address of the migrated server 112 and the instance 132 recreating operation of the server 112 from the coordinator 124 (e.g., as part of a migration notification).

To facilitate migration, the instance 132 illustratively includes a migration agent 113, which can represent software executing on a server 112 to enable migration of services provided by the server 112 to the VM instance 132. For example, the migration agent 113 may be configured to clone a disk drive of a server 112 to a virtual data store 154, and to transmit configuration information to the hosted compute service 130 to enable the server 130 to generate a virtual machine instance 132 with a configuration matching or intercompatible with the server 112. In some cases, the agent 113 may also pass state information of the server 112, such as central processing unit (CPU) register contents, random access memory (RAM) state, changes to a disk drive since cloning completed, or the like. The hosted compute service 130 may then utilize the information provided by the agent 132 to recreate an operational state of the server 112, e.g., by implementing a copy of the operating system and software implemented on the server 112 to provide one or more functionalities or services provided by the server 112. Transfer and re-implementation of operational state of a server 112 to and at a VM instance 132 will, for simplicity sake, be referred to herein as migration of the server 112 to the VM instance 132 (e.g., because an operating system and software of the server 112 have migrated, despite no physical relocation of the server 112). On migration, the agent 113 can obtain a notification from the migration coordinator 124 that migration has occurred, and in accordance with embodiments of the present disclosure, configure the server 112 to halt providing a service. In one embodiment, the server 112 may halt providing a service by releasing a network address of the service, such that the service is no longer accessible at the network address (and such that a gateway 116 may adopt the network address to provide the service). The agent 113 may further configure the server 112 to adopt an alternate network address, to maintain availability of the server 112 to an administrator. In some instances, the agent 113 may also configure the server 112 to halt execution of software providing a service. However, even if such halting of execution does not occur, the reconfiguration of the server 112 to use an alternative address can be viewed as an effective halt of the service on the server 112, as clients 114 would be expected to be unable to reach the service at the server 112 via the prior network address.

Migration of services of the server 112 to a VM instance 132 may also include migration of the agent 113 (as the agent may represent software in a disk drive of the server 112 that was cloned). In some embodiments, the agent 113 may be removed from the VM instance 132 after migration of services of the server 112. In other embodiments, the agent 113 may remain operational on the instance 132, and act to reconfigure the instance 132 to enable interoperation with servers 112 and clients 114 of the on-premises environment 110. For example, the agent 113 may configure the VM instance 132 such that network packets addressed to network addresses of the environment 110 are routed to the gateway 116. In some instances, the agent 113 may communicate with other agents 113 on servers 112 or other VM instances 132 (e.g., via state information maintained at the migration coordinator 124), to maintain knowledge of whether services associated with a server 112 still exist in the environment 110 or have been migrated to the hosted computing environment 120. For example, where an agent 133 on a first VM instance 132 is aware that a second server 112 has been migrated to a second VM instance 132, the agent 113 may configure the first VM instance 132 to direct network packet for services of the second server 112 to the second VM instance 132 directly, rather than to the migration gateway 116 (which might otherwise be configured to route such packets to the second VM instance 132), thus avoiding traversal of the network 104.

Figure 2:
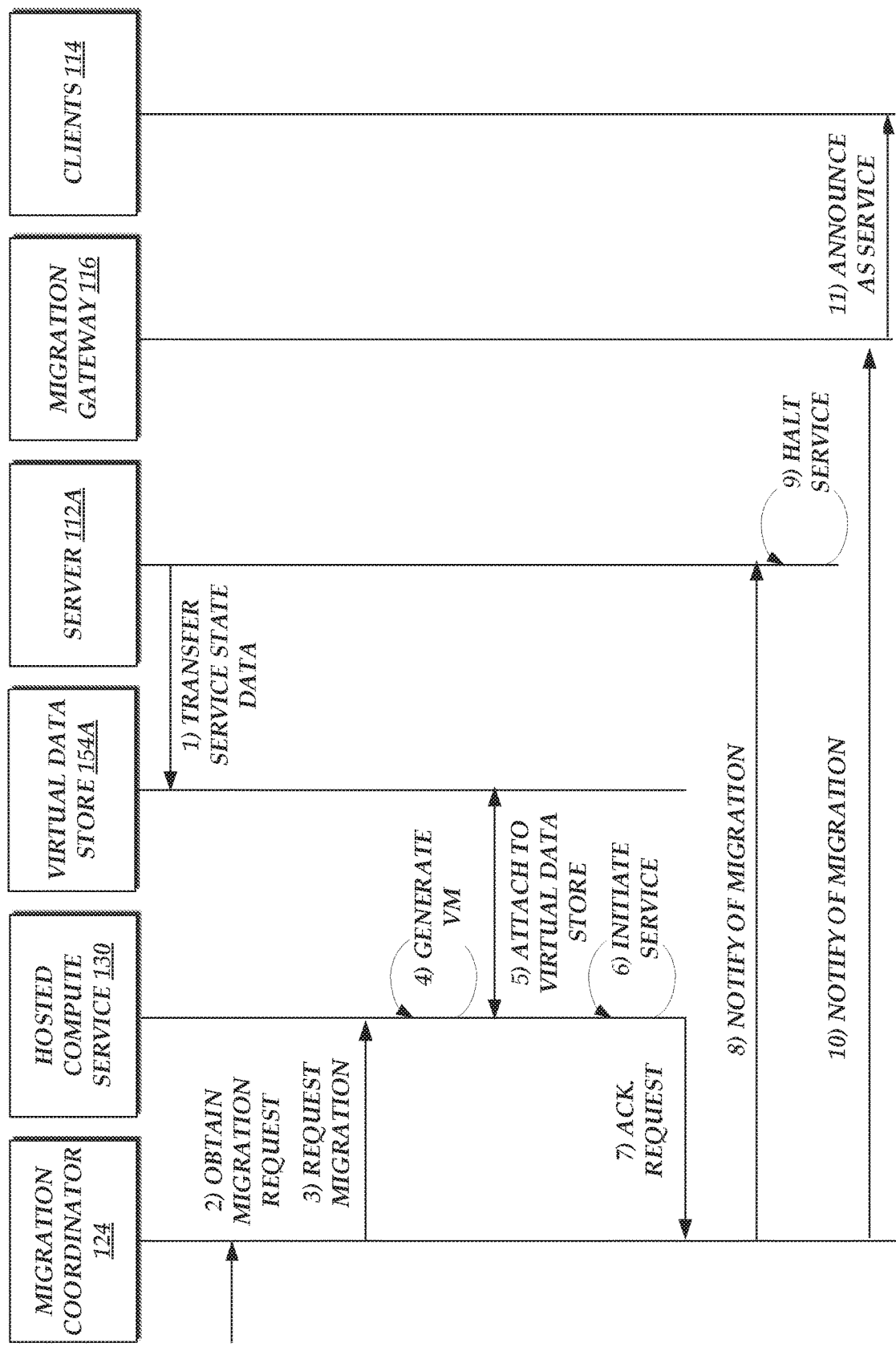
FIG. 2 depicts an example workflow for handling migration of a network-accessible service from the on-premises environment of FIG. 1 to a virtual machine instance of a hosted computing environment while maintaining availability of the service within the on-premises environment.

With reference to FIG. 2, illustrative interactions migrating a server 112A to a VM instance 132 on the hosted compute service 130 will be described. The interactions may occur, for example, after installation of an agent 113 onto a server 112A, indicating a desire of an administrator that the server 112 be migrated.

The interactions begin at (1), where the server 112A transfers state data to a virtual data store 154A, representing a virtualized block storage device. Migration of the state data may include, for example, cloning of a disk drive of the server 112A to the virtual data store 154A. A variety of techniques for cloning disk drives are known in the art and may be utilized in connection with the present disclosure.

Thereafter, at (2), the migration coordinator 124 obtains a request to migrate the server 112A to the hosted computing environment 120. In one embodiment, the migration request may represent an explicit request of a user (e.g., an administrator), as received from, for example, a client device 114. In another embodiment, the migration request may be transmitted from the server 112A, such as automatically subsequent to transfer of the service state data (e.g., such that a delta between state data at the server 112A and state data at the virtual data store 154A is less than a threshold amount). While FIG. 2 depicts transfer of service state data to the data store 154A prior to initiating migration of the server 112A (e.g., while the server 112A continues to operate to provide a service), transfer of state data may additionally or alternatively occur subsequent to migration. However, transfer of state data prior to initiating migration may enable a reduction in downtime of operation of services provided by the server 112A.

At (2), on obtaining the migration request, the migration coordinator 124 transmits to the hosted compute service 130 a request to migrate the server 112A. The request may correspond, for example, to a request to generate a virtual machine instance 132 on the service 130 to replicate operation of the server 112A.

Thereafter, at (4), the hosted compute service 130 generates the virtual machine instance 132, with a configuration matching or intercompatible with the server 112A, such as operating under the same operating system of the server 112A and with similar hardware resources (e.g., a similar or intercompatible CPU architecture, GPU, network connection, etc.). A desired configuration of the VM instance 132 may be specified, for example, in the request from the migration coordinator 124, or may be previously obtained by the service 130 from the server 112 (e.g., from the agent 113). In addition, at (5), the hosted compute service 130 attaches the virtual data store 154A containing state data of the server 112A to the VM instance 132. Accordingly, by replicating a configuration of the server 112A and attaching a virtualized disk cloned from the server 112A, the VM instance 132 may be launched, at (6), to "recreate" the server 112A on the hosted compute service 130, completing migration of the server 112A. The hosted compute service 130 then acknowledges the migration, at (7). The acknowledgement illustratively includes identifying information of a VM instance 132 on the service 130 to be launched, which instance 132 replicates operation of the server 112A. For example, the acknowledgement can include a globally unique identifier (GUID), domain name, network address, etc. of the VM instance 132. While FIG. 2 depicts acknowledgement of migration subsequent to initiation of the service, in some instances acknowledgement may occur prior to initiation. For example, the hosted computing service 130 may acknowledge a request immediately (e.g., prior to interaction (4)).

At (8), the coordinator 124 notifies the service 112A of the migration.

Illustratively, the migration notification may be received and processed by the agent 113, which at (9) causes the server 112A to halt providing one or more services. Illustratively, the agent 113 may cause the services to halt by modifying a network address of the server 112A, such that services are no longer reachable at a past network address. Modifying the network address of the server 112 can beneficially enable the gateway 116 to adopt that address, such that the services previously provided by the server 112 are accessible on the hosted compute service 130 via the gateway 116 at the same address previously used by client 114 to access the service.

In addition, at (10), the coordinator 124 notifies the migration gateway 116 of the migration. In one embodiment, the notification includes identifying information of the VM instance 132 replicating operation of the server 112. In another embodiment, the migration gateway 116 is configured to communicate with the hosted compute service 130 to obtain identifying information of the VM instance 132 (e.g., based on an identifier of the server 112 and an account on the service 130 associated with the on-premises environment 110.

At (11), the migration gateway 116 then announces to clients 114 within the on-premises environment 110 an availability of services of the server 112A at the migration gateway 116. In one embodiment, the announcement corresponds to an ARP response transmitted on the network 118 that associates a MAC address of a network interface on the gateway 116 with an IP address previously associated with the server 112A (e.g., which IP address the server 112A may release on transmission of the notification, at (8)). Accordingly, clients 114 attempting to reach services of the server 112A can be enabled to direct requests to the same IP address previously used to communicate with the server 112A, without apparent change in operation of the server 112A. However, rather than requests reaching the server 112A, the requests are routed to the gateway 116. As discussed below, the gateway 116 can thereafter operate as a proxy for the VM instance 132 replicating operation of the server 112A, such that requests are handled in the same manner as during past operation of the server 112A, without requiring operation of the server 112A to continue. Moreover, because migration of the server 112A is coordinated by the migration coordinator 124, unavailability of those services migrated from the server 112A to the hosted compute service 130 is minimized or eliminated. For example, the coordinator 124 may notify the gateway 116 of migration concurrently with or shortly after notifying the server 112A of migration, such that the server 112A halts providing services at the same time or shortly before the gateway 116 begins providing access to the services. In one embodiment, the notifications to the gateway 112 and the server 112 may be timed such that an unavailability of the server 112 to clients 114 is similar to the unavailability that would occur during a reboot of the server 112. In this manner, the coordinator 124 can enable what appears to be a "reboot to the cloud" functionality, such that operational state of the server 112A is transferred from the on-premises environment 110 to the hosted computing environment 130 in what appears, to clients 114, as a reboot operation.

While FIG. 2 describes migration of a single server 112A to the hosted computing service 130, similar interactions may occur with respect to multiple servers 112. In one embodiment, a single gateway 116 may act as a proxy for multiple servers 112, such that only a single gateway 116 is required within the on-premises environment 110. For example, a single network interface of the gateway 116 may be associated with IP addresses of each of the multiple servers 112, such that traffic for services of any of the servers 112 is directed to the gateway 116. As servers 112 are migrated from the on-premises environment 110 to the hosted computing environment 120, it is expected that traffic across the migration gateway 116 would initially increase, but then fall as interdependent services are migrated and enabled to communicate within the environment 120. Accordingly, when migration of all servers 112 has completed, the migration gateway 116 may be decommissioned. In this manner, operation of the gateway 116 can facilitate gradual, rather than immediate, migration of servers 112. Moreover, while FIG. 2 depicts coordination of migration by a migration coordinator 124 within the hosted computing environment 130, in some embodiments the coordinator 124 may be implemented within the on-premises environment 110. For example, a coordinator 124 may be executed on a server 112 or incorporated into an agent 113.

Figure 3:
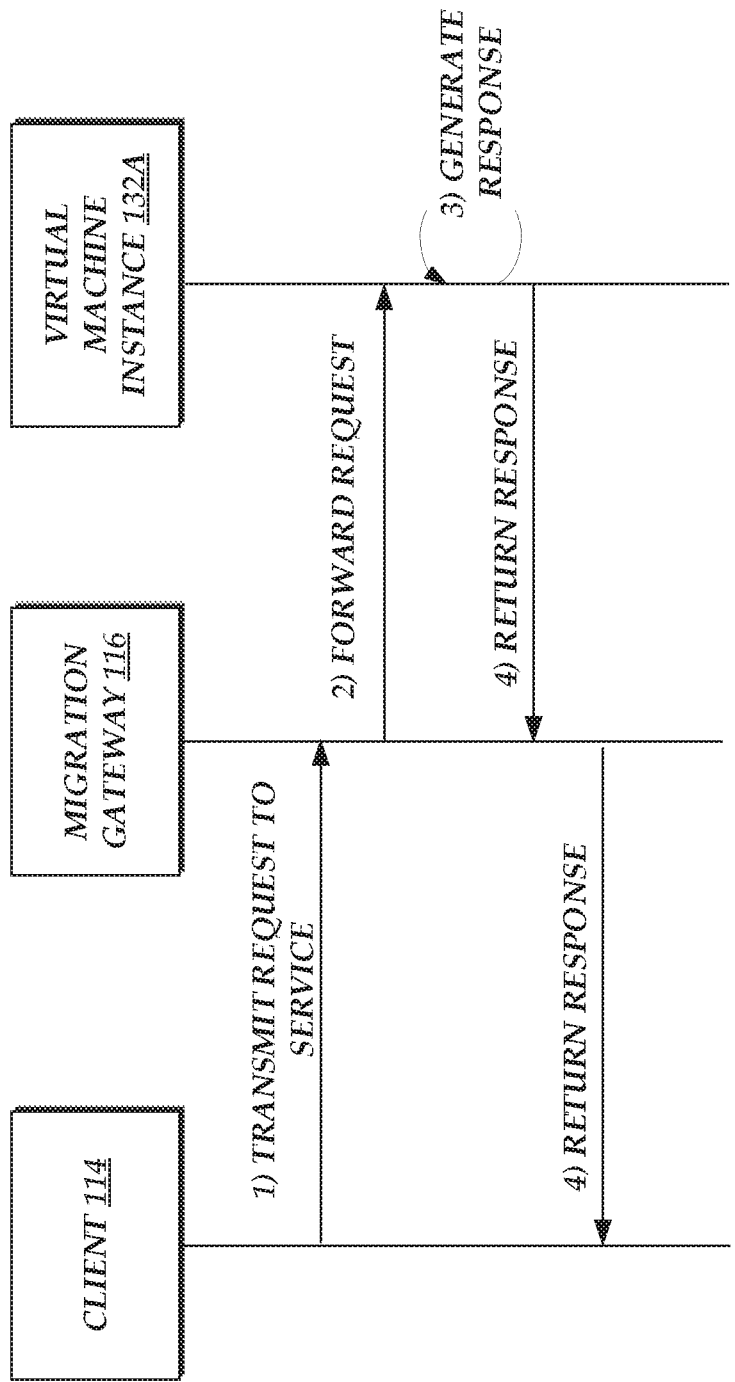
FIG. 3 depicts an example workflow for handling requests, originating within the on-premises environment of FIG. 1, to access a network-accessible service migrated to the hosted computing environment.

Illustrative interactions depicting operation of the gate 116 as a proxy for the VM instance 132, by handling requests originating within the on-premises environment 110 to access a network-accessible service migrated to the hosted computing service 130, are shown in FIG. 3.

The interactions of FIG. 3 begin at (1), where a client 114 transmits a request for a network-accessible service, previously provided by a now-migrated server 112, to the migration gateway 116. At (2), on receiving the request, the gateway 116 forwards the request to the VM instance 132A replicating operation of the now-migrated server 112. In one embodiment, the gateway 116 may identify the VM instance 132A based on a network address to which the request was transmitted by the client 114. For example, the gateway 116 may maintain information mapping each IP address of each migrated server 112 to identifying information of a VM instance 132 replicating operation of that server 112, such as a network address of the VM instance 132. Thus, on receiving a request to the IP address of a migrated server 112, the gateway 116 can forward the request to the associated VM instance 132. In one embodiment, network address translation (NAT) is utilized to forward the request. At (3), the instance 132A can thereafter generate a response to the request, in accordance with a service provided by the instance 132A. The response is then transmitted to the gateway 116, which is returned to the client 114, at (4). Thus, the client 114 may continue to transmit requests for the service to an endpoint locally within the network 118, and obtain responses to such requests, in a manner similar or identical to transmission of requests and responses prior to migration of the server 112.

In some cases, forwarding of the request may require little or no modification of the request content. For example, in the context of non-encrypted HTTP traffic, forwarding of the request may require modification of headers of an HTTP packet, without modification of an HTTP packet body. However, in the context of encrypted traffic, such as Transport Layer Security (TLS)-encrypted HTTP packets, forwarding of the request to the VM instance 132 without modification may result in authentication failures at the client 114 (e.g., because a response was generated at a device other than the server 112). Accordingly, in some embodiments, the gateway 116 may act as a TLS termination point, initiating a first TLS connection with the client 114 over which to obtain the request, and initiating a second TLS connection with the instance 132A. The gateway 116 may thus decrypt requests obtained from the client 114 prior to reencrypting the requests for transmission to the instance 132A. Similarly, the gateway 116 may decrypt response obtained from the instance 132A prior to reencrypting those responses for transmission to the client 114. To facilitate reencryption, a certificate of the gateway 116 can illustratively be installed on the client 114 prior to use of the gateway 116 as a proxy for a migrated server 112.

While FIG. 3 depicts generation of a response as occurring at the VM instance 132A, in some instances the VM instance 132A may communicate with other network services in order to generate a response. For example, where the request of FIG. 3 is a request to access a network resource, the instance 132A may pass information about the request (e.g., an authentication token) to an authentication service in order to validate the request. As the instance 132A illustratively replicates operation of a server 112 previously within the on-premises environment 110, the instance 132A may attempt to reach that authentication service within the network 118, despite the instance 132A no longer being locally within that network. To address this, the instance 132A may be configured to detect requests to network addresses within the network 118, and to redirect such requests to the migration gateway 116, which is illustratively associated with a network address that is reachable via the network 104. The gateway 116 may then act as a proxy for communications between the VM instance 132A and a server 112 within the environment 110 providing the authentication service (or any other service). Interactions for acting as such a proxy are similar to those of FIG. 3 and thus will not be redescribed. In such an example, the VM instance 132A may represent the client 114, while the VM instance 132A is replaced with a server 112 within the network 118.

In some instances, multiple servers 112 may be migrated to the hosted computing environment 120, each of which is configured to reach other services within the network 118 via the migration gateway 116. However, in some examples, a first VM instance 132 may be configured to interact with a service previously within the network 118, but subsequently migrated to the hosted computing environment 120 as a second VM instance 132. This may result in the first VM instance 132 attempting to contact the service via the gateway 116 (e.g., by transmitting a packet to an IP address previously associated with the service, which packet is redirected to the gateway 116), which the gateway 116 is configured to return to the second VM instance 132. Such redirection outside of the environment 120 may undesirably delay communications between two migrated services. Accordingly, in one embodiment, each VM instance 132 representing a migrated server 112 may maintain state information of other instances 132 representing migrated servers 112, which state information may be updated on each request to the hosted environment 120 to migrate a server 112. Thereafter, requests originating at the VM instance 132 to reach a service of a migrated server 112 (e.g., addressed to a network address within the network 118 previously associated with the migrated server 112) may be redirected, such as by operation of an agent 113, to the instance 132 recreating operation of that migrated server 112. In this manner, traversal of the migration gateway 116 can be avoided for communications between two migrated services.

Figure 4:
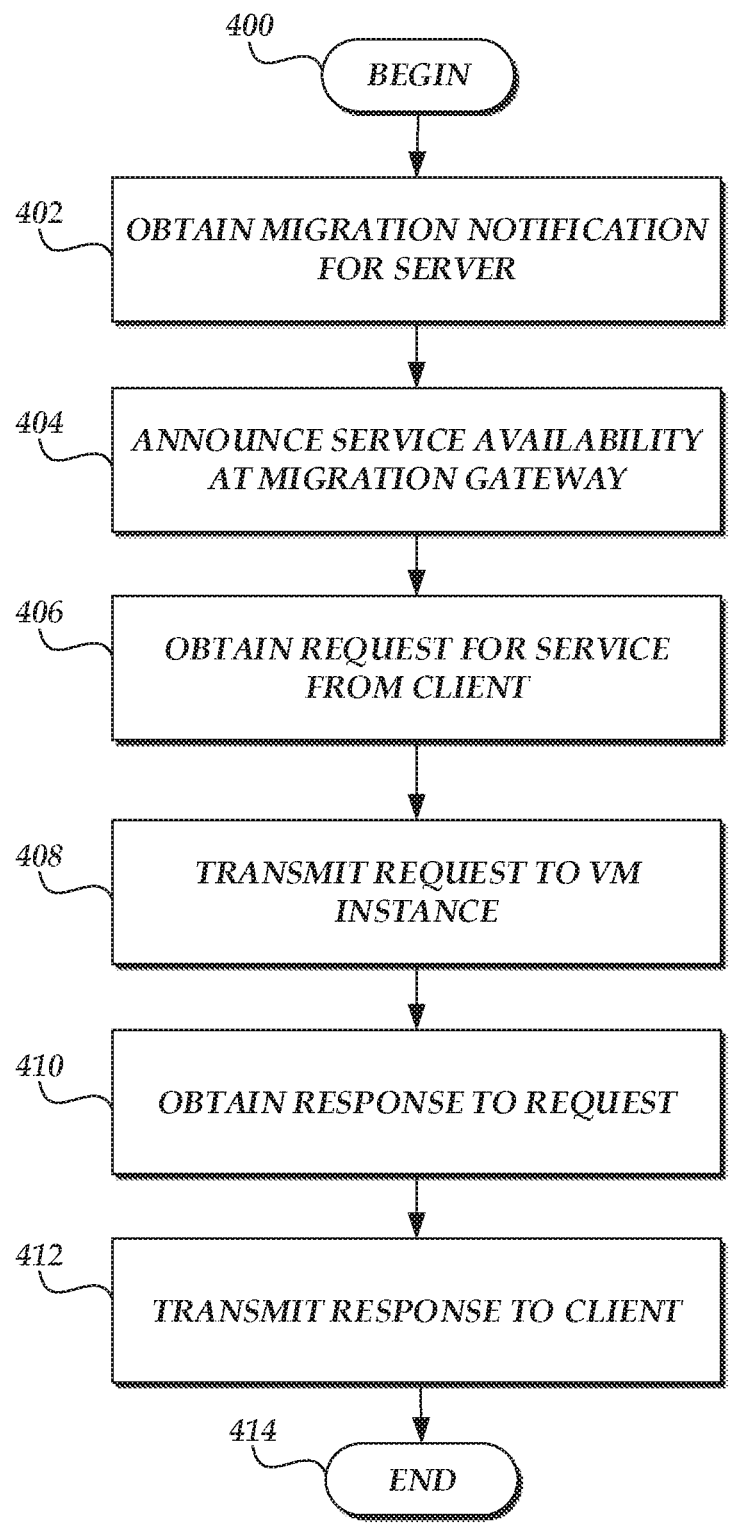
FIG. 4 is a flowchart of an example routine for implementing a migration gateway enabling the handling of requests, originating within the on-premises environment of FIG. 1, to access a network-accessible service migrated to the hosted computing environment.

With reference to FIG. 4, an illustrative routine 400 will be described enabling the handling of requests, originating within the on-premises environment 110, to access a network-accessible service migrated to the hosted computing environment 120. The routine 400 is illustratively implemented by a migration gateway 116.

The routine 400 begins at block 402, where the migration gateway 116 obtains a migration notification for a server 112. This migration notification may be transmitted, for example, the coordinator 124. The notification illustratively includes identifying information for the VM instance 132, such as a network address of the instance reachable from the gateway 116.

At block 404, the gateway 116 announces availability of services previously provided by the server 112 at the gateway 116, redirecting traffic from the server 112 to the gateway 116. In one embodiment, announcement may occur in the form of an ARP response (which may be referred to as a "gratuitous ARP," as the response may occur independently of a request) announcing a MAC address of the gateway 116 as associated with an IP address of the server 112. Use of an ARP response may beneficially enable redirection of requests to the gateway 116 without requiring change in network transmission from clients 114. This is in contrast to other announcement techniques, such as modification of DNS records, which generally require clients 114 to address network packets to a different network address that must be resolved prior to sending such packets.

Thereafter, the gateway 116 may act as a proxy for the VM instance 132 replicating operation of the server 112, by enabling communication between the VM instance 132 and devices on the network 118 as if the VM instance 132 existed on the network 118. Specifically, at block 406, the VM instance 132 can obtain a request from a client 114 for a service previously provided by the server 112. The request may be included, for example, a network packet addressed to an IP address previously associated with the server, but now directed to the gateway 116.

Accordingly, at block 408, the gateway 116 can forward that request to a VM instance 132 to which operations of the server 112 were migrated. The request thus illustratively traverses a network between the on-premises environment 110 and the hosted computing environment 120, such as network 104, to reach the VM instance 132. Illustratively, the gateway 116 may identify the request as associated with the server 112 based on an IP address to which the request was transmitted, and thus be enabled to forward the request to the instance 132 without requiring inspection of the content of the request. As discussed above, in other instances (such as the use of TLS for the request), the gateway 116 may modify the request, such as by decrypting the request and reencrypting the request for transmission to the instance 132.

At block 410, the gateway 116 obtains a response to the request from the instance 132, which may be transmitted from the instance 132 to a network address of the gateway 116 (e.g., via the same TCP connection used to transmit the request, via a separate connection such as a UDP connection, etc.). The gateway 116 then, at block 412, returns the response to the client 114. Thus, by implementation of the routine 400, a client 114 is enabled to communicate with services previously provided by a server 112 but migrated to a different environment, as if those services existed within a local network (e.g., network 118), without reconfiguration of the client 114. The routine 400 then ends at block 414.

While the routine 400 is described above with respect to specific examples of environments (e.g., an on-premises environment 110 and a hosted computing environment 120), embodiments of the present disclosure can enable migration of a server 112 between any two distinct environments (e.g., associated with different local area networks, subnets, etc., such that migration of a server 112 between environments causes traffic addressed to the server 112 in the first environment not to reach a device to which operation of the server 112 has been migrated). Moreover, while the routine 400 is described with reference to migration of a server 112 to a VM instance 132, operational state of a server 112 may additionally be transferred to other environments, such as a bare metal server. Still further, while the routine 400 is described as facilitating requests from clients 114 within a first environment to reach an instance in a second environment, the gateway 116 may additionally enable requests from the instance in the second environment to reach devices within the first environment, thus enabling two-way communication between devices within the first environment and instances within a second environment to which servers of the first environment have been migrated. Accordingly, description of the routine 400 should be understood to be illustrative in nature.

Figure 5:
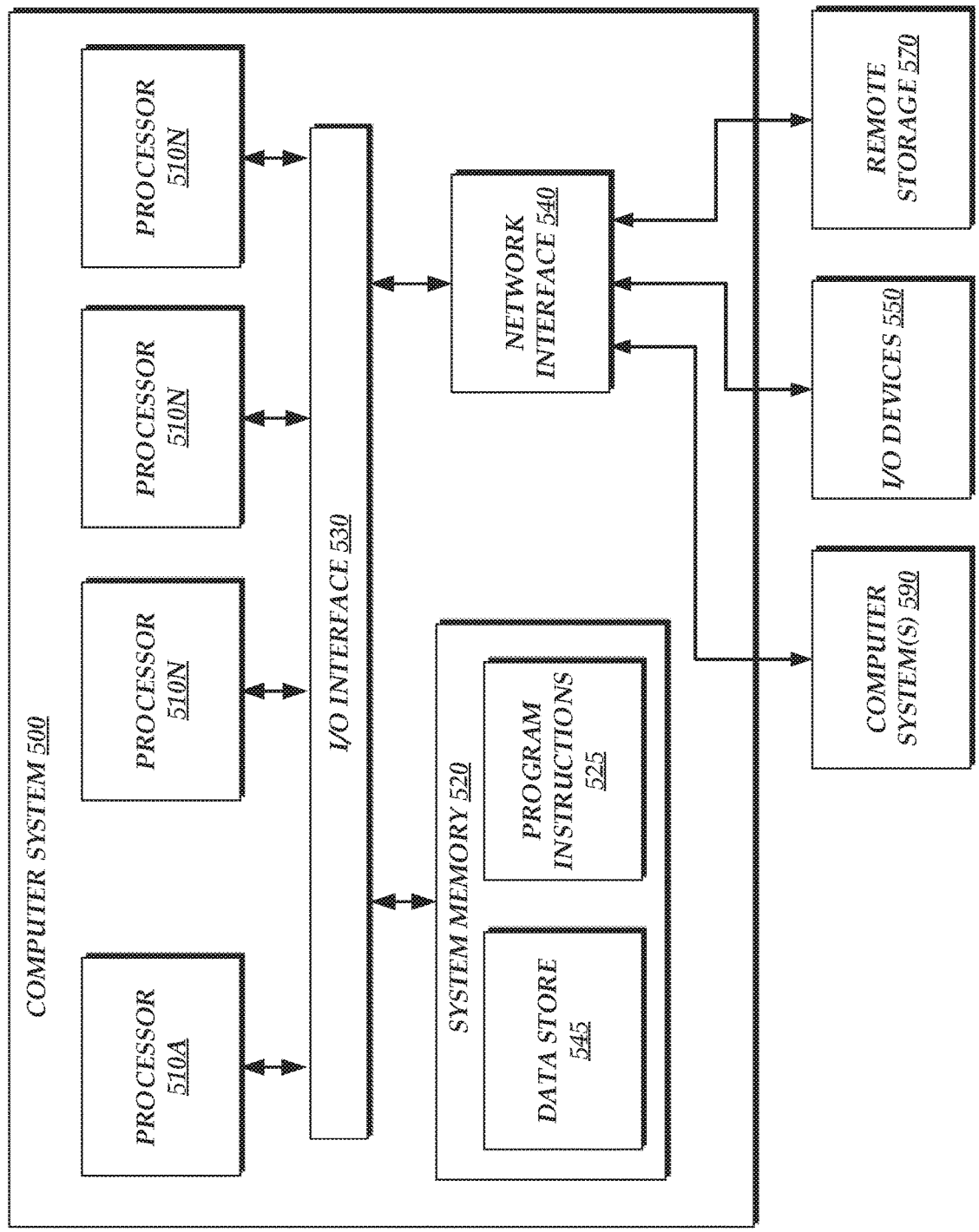
FIG. 5 depicts a schematic diagram of an example computing system that may implement aspects of the present disclosure.

FIG. 5 is a block diagram illustrating an example computer system, according to various embodiments. For example, instances of the computer system 500 may be configured to implement the gateway 116, migration coordinator 124, VM instances 132, servers 112, clients 114, and the like. Computer system 500 may be any of various types of devices, including, but not limited to, a personal computer system, desktop computer, laptop or notebook computer, mainframe computer system, handheld computer, workstation, network computer, a consumer device, application server, storage device, telephone, mobile telephone, or in general any type of computing device.

Computer system 500 includes one or more processors 510 (any of which may include multiple cores, which may be single or multi-threaded) coupled to a system memory 520 via an input/output (I/O) interface 530. Computer system 500 further includes a network interface 540 coupled to I/O interface 530. In various embodiments, computer system 500 may be a uniprocessor system including one processor 510, or a multiprocessor system including several processors 510 (e.g., two, four, eight, or another suitable number). Processors 510 may be any suitable processors capable of executing instructions. For example, in various embodiments, processors 510 may be general-purpose or embedded processors implementing any of a variety of instruction set architectures (ISAs), such as the x86, PowerPC, SPARC, or MIPS ISAs, or any other suitable ISA. In multiprocessor systems, each of processors 510 may commonly, but not necessarily, implement the same ISA. The computer system 500 also includes one or more network communication devices (e.g., network interface 540) for communicating with other systems and/or components over a communications network (e.g. Internet, LAN, etc.).

In the illustrated embodiment, computer system 500 also includes one or more persistent storage devices 560 and/or one or more I/O devices 580. In various embodiments, persistent storage devices 560 may correspond to disk drives, tape drives, solid state memory, other mass storage devices, block-based storage devices, or any other persistent storage device. Computer system 500 (or a distributed application or operating system operating thereon) may store instructions and/or data in persistent storage devices 560, as desired, and may retrieve the stored instruction and/or data as needed. For example, in some embodiments, computer system 500 may act as a worker, and persistent storage 560 may include the SSDs attached to that worker to facilitate storage of write journal entries.

Computer system 500 includes one or more system memories 520 that are configured to store instructions and data accessible by processor(s) 510. In various embodiments, system memories 520 may be implemented using any suitable memory technology (e.g., one or more of cache, static random access memory (SRAM), DRAM, RDRAM, EDO RAM, DDR 10 RAM, synchronous dynamic RAM (SDRAM), Rambus RAM, EEPROM, non-volatile/Flash-type memory, or any other type of memory). System memory 520 may contain program instructions 525 that are executable by processor(s) 510 to implement the routines, interactions, and techniques described herein. In various embodiments, program instructions 525 may be encoded in platform native binary, any interpreted language such as Java byte-code, or in any other language such as C/C++, Java, etc., or in any combination thereof. For example, in the illustrated embodiment, program instructions 525 may include program instructions executable to implement the functionality of a worker 152. In some embodiments, program instructions 525 may implement the migration gateway 116, the coordinator 124, or other elements of the environment 100.

In some embodiments, program instructions 525 may include instructions executable to implement an operating system (not shown), which may be any of various operating systems, such as UNIX, LINUX, Solaris, MacOS, Windows, etc. Any or all of program instructions 525 may be provided as a computer program product, or software, that may include a non-transitory computer-readable storage medium having stored thereon instructions, which may be used to program a computer system (or other electronic devices) to perform a process according to various embodiments. A non-transitory computer-readable storage medium may include any mechanism for storing information in a form (e.g., software, processing application) readable by a machine (e.g., a computer). Generally speaking, a non-transitory computer-accessible medium may include computer-readable storage media or memory media such as magnetic or optical media, e.g., disk or DVD/CD-ROM coupled to computer system 500 via I/O interface 530. A non-transitory computer-readable storage medium may also include any volatile or non-volatile media such as RAM (e.g. SDRAM, DDR SDRAM, RDRAM, SRAM, etc.), ROM, etc., that may be included in some embodiments of computer system 500 as system memory 520 or another type of memory. In other embodiments, program instructions may be communicated using optical, acoustical or other form of propagated signal (e.g., carrier waves, infrared signals, digital signals, etc.) conveyed via a communication medium such as a network and/or a wireless link, such as may be implemented via network interface 540.

In some embodiments, system memory 520 may include data store 545. In general, system memory 520 (e.g., data store 545 within system memory 520), persistent storage 560, and/or remote storage 570 may store write journal entries, data blocks, replicas of data blocks, metadata associated with data blocks and/or their state, configuration information, and/or any other information usable in implementing the methods and techniques described herein.

In one embodiment, I/O interface 530 may be configured to coordinate I/O traffic between processor 510, system memory 520 and any peripheral devices in the system, including through network interface 540 or other peripheral interfaces. In some embodiments, I/O interface 530 may perform any necessary protocol, timing or other data transformations to convert data signals from one component (e.g., system memory 520) into a format suitable for use by another component (e.g., processor 510). In some embodiments, I/O interface 530 may include support for devices attached through various types of peripheral buses, such as a variant of the Peripheral Component Interconnect (PCI) bus standard or the Universal Serial Bus (USB) standard, for example. In some embodiments, the function of I/O interface 530 may be split into two or more separate components, such as a north bridge and a south bridge, for example. Also, in some embodiments, some or all of the functionality of I/O interface 530, such as an interface to system memory 520, may be incorporated directly into processor 510.

Network interface 540 may be configured to allow data to be exchanged between computer system 500 and other devices attached to a network, such as other computer systems 590, for example. In addition, network interface 540 may be configured to allow communication between computer system 500 and various I/O devices 550 and/or remote storage 570 (which may represent, for example, data stores 154). Input/output devices 550 may, in some embodiments, include one or more display terminals, keyboards, keypads, touchpads, scanning devices, voice or optical recognition devices, or any other devices suitable for entering or retrieving data by one or more computer systems 500. Multiple input/output devices 550 may be present in computer system 500 or may be distributed on various nodes of a distributed system that includes computer system 500. In some embodiments, similar input/output devices may be separate from computer system 500 and may interact with one or more nodes of a distributed system that includes computer system 500 through a wired or wireless connection, such as over network interface 540. Network interface 540 may commonly support one or more wireless networking protocols (e.g., Wi-Fi/IEEE 802.11, or another wireless networking standard). However, in various embodiments, network interface 540 may support communication via any suitable wired or wireless general data networks, such as other types of Ethernet networks, for example. Additionally, network interface 540 may support communication via telecommunications/telephony networks such as analog voice networks or digital fiber communications networks, via storage area networks such as Fibre Channel SANs, or via any other suitable type of network and/or protocol. In various embodiments, computer system 500 may include more, fewer, or different components than those illustrated in FIG. 5 (e.g., displays, video cards, audio cards, peripheral devices, other network interfaces such as an ATM interface, an Ethernet interface, a Frame Relay interface, etc.)

It is noted that any of the distributed system embodiments described herein, or any of their components, may be implemented as one or more network-based services. For example, a compute cluster within a computing service may present computing and/or storage services and/or other types of services that employ the distributed computing systems described herein to clients as network-based services. In some embodiments, a network-based service may be implemented by a software and/or hardware system designed to support interoperable machine-to-machine interaction over a network. A network-based service may have an interface described in a machine-processable format, such as the Web Services Description Language (WSDL). Other systems may interact with the network-based service in a manner prescribed by the description of the network-based service's interface. For example, the network-based service may define various operations that other systems may invoke, and may define a particular application programming interface (API) to which other systems may be expected to conform when requesting the various operations.

In various embodiments, a network-based service may be requested or invoked through the use of a message that includes parameters and/or data associated with the network-based services request. Such a message may be formatted according to a particular markup language such as Extensible Markup Language (XML), and/or may be encapsulated using a protocol such as Simple Object Access Protocol (SOAP). To perform a network-based services request, a network-based services client may assemble a message including the request and convey the message to an addressable endpoint (e.g., a Uniform Resource Locator (URL)) corresponding to the network-based service, using an Internet-based application layer transfer protocol such as Hypertext Transfer Protocol (HTTP).

In some embodiments, network-based services may be implemented using Representational State Transfer ("RESTful") techniques rather than message-based techniques. For example, a network-based service implemented according to a RESTful technique may be invoked through parameters included within an HTTP method such as PUT, GET, or DELETE, rather than encapsulated within a SOAP message.

Terminology

All of the methods and tasks described herein may be performed and fully automated by a computer system. The computer system may, in some cases, include multiple distinct computers or computing devices (e.g., physical servers, workstations, storage arrays, cloud computing resources, etc.) that communicate and interoperate over a network to perform the described functions. Each such computing device typically includes a processor (or multiple processors) that executes program instructions or modules stored in a memory or other non-transitory computer-readable storage medium or device (e.g., solid state storage devices, disk drives, etc.). The various functions disclosed herein may be embodied in such program instructions, or may be implemented in application-specific circuitry (e.g., ASICs or FPGAs) of the computer system. Where the computer system includes multiple computing devices, these devices may, but need not, be co-located. The results of the disclosed methods and tasks may be persistently stored by transforming physical storage devices, such as solid-state memory chips or magnetic disks, into a different state. In some embodiments, the computer system may be a cloud-based computing system whose processing resources are shared by multiple distinct business entities or other users.

The processes described herein or illustrated in the figures of the present disclosure may begin in response to an event, such as on a predetermined or dynamically determined schedule, on demand when initiated by a user or system administrator, or in response to some other event. When such processes are initiated, a set of executable program instructions stored on one or more non-transitory computer-readable media (e.g., hard drive, flash memory, removable media, etc.) may be loaded into memory (e.g., RAM) of a server or other computing device. The executable instructions may then be executed by a hardware-based computer processor of the computing device. In some embodiments, such processes or portions thereof may be implemented on multiple computing devices and/or multiple processors, serially or in parallel.

Depending on the embodiment, certain acts, events, or functions of any of the processes or algorithms described herein can be performed in a different sequence, can be added, merged, or left out altogether (e.g., not all described operations or events are necessary for the practice of the algorithm). Moreover, in certain embodiments, operations or events can be performed concurrently, e.g., through multi-threaded processing, interrupt processing, or multiple processors or processor cores or on other parallel architectures, rather than sequentially.

The various illustrative logical blocks, modules, routines, and algorithm steps described in connection with the embodiments disclosed herein can be implemented as electronic hardware (e.g., ASICs or FPGA devices), computer software that runs on computer hardware, or combinations of both. Moreover, the various illustrative logical blocks and modules described in connection with the embodiments disclosed herein can be implemented or performed by a machine, such as a processor device, a digital signal processor ("DSP"), an application specific integrated circuit ("ASIC"), a field programmable gate array ("FPGA") or other programmable logic device, discrete gate or transistor logic, discrete hardware components, or any combination thereof designed to perform the functions described herein. A processor device can be a microprocessor, but in the alternative, the processor device can be a controller, microcontroller, or state machine, combinations of the same, or the like. A processor device can include electrical circuitry configured to process computer-executable instructions. In another embodiment, a processor device includes an FPGA or other programmable device that performs logic operations without processing computer-executable instructions. A processor device can also be implemented as a combination of computing devices, e.g., a combination of a DSP and a microprocessor, a plurality of microprocessors, one or more microprocessors in conjunction with a DSP core, or any other such configuration. Although described herein primarily with respect to digital technology, a processor device may also include primarily analog components. For example, some or all of the rendering techniques described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

The elements of a method, process, routine, or algorithm described in connection with the embodiments disclosed herein can be embodied directly in hardware, in a software module executed by a processor device, or in a combination of the two. A software module can reside in RAM memory, flash memory, ROM memory, EPROM memory, EEPROM memory, registers, hard disk, a removable disk, a CD-ROM, or any other form of a non-transitory computer-readable storage medium. An exemplary storage medium can be coupled to the processor device such that the processor device can read information from, and write information to, the storage medium. In the alternative, the storage medium can be integral to the processor device. The processor device and the storage medium can reside in an ASIC. The ASIC can reside in a user terminal. In the alternative, the processor device and the storage medium can reside as discrete components in a user terminal.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements or steps. Thus, such conditional language is not generally intended to imply that features, elements or steps are in any way required for one or more embodiments or that one or more embodiments necessarily include logic for deciding, with or without other input or prompting, whether these features, elements or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, or Z). Thus, such disjunctive language is not generally intended to, and should not, imply that certain embodiments require at least one of X, at least one of Y, and at least one of Z to each be present.

While the above detailed description has shown, described, and pointed out novel features as applied to various embodiments, it can be understood that various omissions, substitutions, and changes in the form and details of the devices or algorithms illustrated can be made without departing from the spirit of the disclosure. As can be recognized, certain embodiments described herein can be embodied within a form that does not provide all of the features and benefits set forth herein, as some features can be used or practiced separately from others. All changes which come within the meaning and range of equivalency of the claims are to be embraced within their scope.

What is claimed is:

1. A system comprising:
an on-premises computing environment including:
a server computing device implementing a network-accessible service;
a client computing device of the network-accessible service; and
a migration gateway device; and
a hosted computing environment including a host computing device implementing a virtual machine instance;
wherein the server computing device implementing the network-accessible service is configured to migrate the network-accessible service from the server computing device to the virtual machine instance; and
wherein the migration gateway device comprises one or more processors configured to:
detect migration of the network-accessible service from the server computing device to the virtual machine instance; and
in response to the migration, announce to the client device an availability of the network-accessible service at the migration gateway device;
obtain from the client device a request to access the network-accessible service;
forward the request to the virtual machine instance to which the network-accessible service was migrated;
obtain a response to the request from the virtual machine instance; and
transmit the response to the client device.

2. The system of claim 1, wherein the hosted computing environment further includes a coordinator computing device configured to instruct the server computing device to migrate the network-accessible service and configured to notify the migration gateway device of the migration.

3. The system of claim 1, wherein the on-premises computing environment corresponds to a first network environment, and wherein to announce to the client device an availability of the network-accessible service at the migration gateway device, the migration gateway device is configured to transmit an Address Resolution Protocol (ARP) response within the first network environment that associates a Media Access Control (MAC) address of the migration gateway device with an Internet Protocol (IP) address previously associated with the server computing device.

4. The system of claim 1, wherein the on-premises environment further includes a second server computing device implementing a second network-accessible service, and wherein migration gateway device is further configured to obtain communications from the virtual machine instance to the second network-accessible service and to forward the communications to the second service computing device within the on-premises environment.

5. A computer-implemented method comprising:
migrating a network-accessible service from a first computing device in a first network environment to a second computing device in a second network environment; and
implementing, within the first network environment, a migration gateway enabling access to the second computing device in the second network environment from within the first network environment, wherein implementing the migration gateway comprises, at the migration gateway:
announcing within the first network environment an availability of the network-accessible service at the migration gateway;
obtaining from a client device within the first network environment a request to access the network-accessible service;
forwarding the request to the second computing device in the second network environment to which the network-accessible service was migrated;
obtaining a response to the request from the second computing device; and
transmitting the response to the client device.

6. The computer-implemented method of claim 5, wherein the first network environment corresponds to an on-premises computing environment, and the second network environment corresponds to a hosted computing environment.

7. The computer-implemented method of claim 6, wherein the second computing device is a virtual machine instance within the hosted computing environment.

8. The computer-implemented method of claim 5, wherein announcing the availability of the network-accessible service at the migration gateway comprises transmitting an Address Resolution Protocol (ARP) response within the first network environment that associates a Media Access Control (MAC) address of the migration gateway with an Internet Protocol (IP) address previously associated with the first computing device.

9. The computer-implemented method of claim 5, wherein the request to access the network-accessible service is obtained over a local area network (LAN), and wherein forwarding the request occurs over a wide area network (WAN).

10. The computer-implemented method of claim 5 further comprises migrating a second network-accessible service from a third computing device in a first network environment to a fourth computing device in the second network environment, and wherein implementing the migration gateway further comprises configuring the migration gateway to act as a proxy within the first network environment for the fourth computing device.

11. The computer-implemented method of claim 5, wherein the request is representing within a network packet, and wherein forwarding the request to the second computing device in the second network environment to which the network-accessible service was migrated comprises modifying headers of the network packet to address the packet to a network address of the second computing device.

12. The computer-implemented method of claim 5, wherein implementing the migration gateway further comprises, at the migration gateway:
   obtaining a network transmission from the second computing device to a destination computing device within the first computing environment; and
   forwarding the network transmission to the destination computing device within the first computing environment.

13. Non-transitory computer-readable media comprising computer-executable instructions that, when executed by a migration gateway device, cause the migration gateway device to:
   detect migration of a network-accessible service from a first computing device in a first network environment in which the migration gateway device is implemented to a second computing device in a second network environment;
   announce within the first network environment an availability of the network-accessible service at the migration gateway device;
   obtain from a client device within the first network environment a request to access the network-accessible service; and
   forward the request to the second computing device in the second network environment to which the network-accessible service was migrated.

14. The non-transitory computer-readable media of claim 13, wherein the request obtained from the client device is obtained via first Transport Security Layer (TLS) connection, and wherein the instructions cause the migration gateway device to forward the request to the second computing device via a second TLS connection.

15. The non-transitory computer-readable media of claim 13, wherein to announce within the first network environment the availability of the network-accessible service at the migration gateway device, the instructions cause the migration gateway device to transmit an Address Resolution Protocol (ARP) response within the first network environment.

16. The non-transitory computer-readable media of claim 13, wherein the instructions cause the migration gateway device to announce the availability of the network-accessible service at the migration gateway device responsive to detecting migration of the service from the first computing device to the second computing device.

17. The non-transitory computer-readable media of claim 13, wherein detecting migration of the network-accessible service comprises obtaining a notification from a coordinator computing device configured to concurrently instruct the first computing device to migrate the network-accessible service to the second computing device, and wherein the notification includes a network address of the second computing device.

18. The non-transitory computer-readable media of claim 13, wherein network-accessible service is a first network accessible service, and wherein the instructions further cause the migration gateway device to:
   detect migration of a second network-accessible service from a third computing device in the first network environment to a fourth computing device in the second network environment;
   announce within the first network environment an availability of the second network-accessible service at the migration gateway device;
   obtain from the client device within the first network environment a request to access the second network-accessible service; and
   forward the request to access the second network-accessible service to the fourth computing device.

19. The non-transitory computer-readable media of claim 18, wherein to announce the availability of the first network-accessible service at the migration gateway device, the instructions cause the migration gateway device to adopt a network address of the first computing device, wherein to announce the availability of the second network-accessible service at the migration gateway device, the instructions cause the migration gateway device to adopt a network address of the third computing device, and wherein the instructions further cause the migration gateway device to distinguish requests for the first network-accessible from requests for the second network-accessible service based on a network address to which the respective request are transmitted.

20. The non-transitory computer-readable media of claim 13, wherein the instructions further cause the migration gateway device to obtain transmissions from the second network environment for devices within the first network environment and to forward the transmissions to the devices within the first network environment.

* * * * *

UNITED STATES PATENT AND TRADEMARK OFFICE
CERTIFICATE OF CORRECTION

PATENT NO. : 11,392,402 B1
APPLICATION NO. : 16/586419
DATED : July 19, 2022
INVENTOR(S) : Theodore Allen Carroll It is certified that error appears in the above-identified patent and that said Letters Patent is hereby corrected as shown below:

In the Claims

Column 21, Line 55, Claim 14, delete "Security Layer" and insert -- Layer Security --.

Signed and Sealed this
Thirteenth Day of December, 2022

Katherine Kelly Vidal
*Director of the United States Patent and Trademark Office*